United States Patent
Beling

[11] 3,767,998
[45] Oct. 23, 1973

[54] CONSTANT CURRENT POWER SUPPLY

[75] Inventor: Thomas E. Beling, Framingham, Mass.

[73] Assignee: Sigma Instruments Inc., Braintree, Mass.

[22] Filed: Mar. 3, 1972

[21] Appl. No.: 231,666

[52] U.S. Cl............ 321/18, 321/18, 323/4, 323/22 SC, 323/38
[51] Int. Cl............................................. H02m 7/20
[58] Field of Search............... 321/4, 18, 19, 27 R; 323/4, 22 SC, 34–37, 38; 318/345

[56] References Cited
UNITED STATES PATENTS

| | | | |
|---|---|---|---|
| 3,372,324 | 3/1968 | Scarlett............................. | 321/18 X |
| 3,462,671 | 8/1969 | Lawn................................. | 321/18 |
| 3,564,388 | 2/1971 | Nolf.................................. | 321/18 |
| 3,273,043 | 9/1966 | Clarke et al...................... | 321/18 |

Primary Examiner—Gerald Goldberg
Attorney—David Toren et al.

[57] ABSTRACT

In the power supply disclosed, a bridge rectifier receives alternating current and forms a unidirectional voltage across a filter capacitor. A thyristor in each of two adjacent arms of the bridge controls the voltage produced. A suitable amplifier biases a control potential sensed by a current sensing resistor and applies it to one side of a comparator. A sweep circuit forms a periodic waveform that remains substantially zero for one half of each period and rises during the second half of the period in a path that corresponds to the last quarter of a sine wave cycle. The comparator triggers the thyristors each time the sweep waveform exceeds the biased control potential. Each sweep period is formed during a half cycle of the input voltage, so that two sweeps occur for each cycle of input voltage.

35 Claims, 14 Drawing Figures

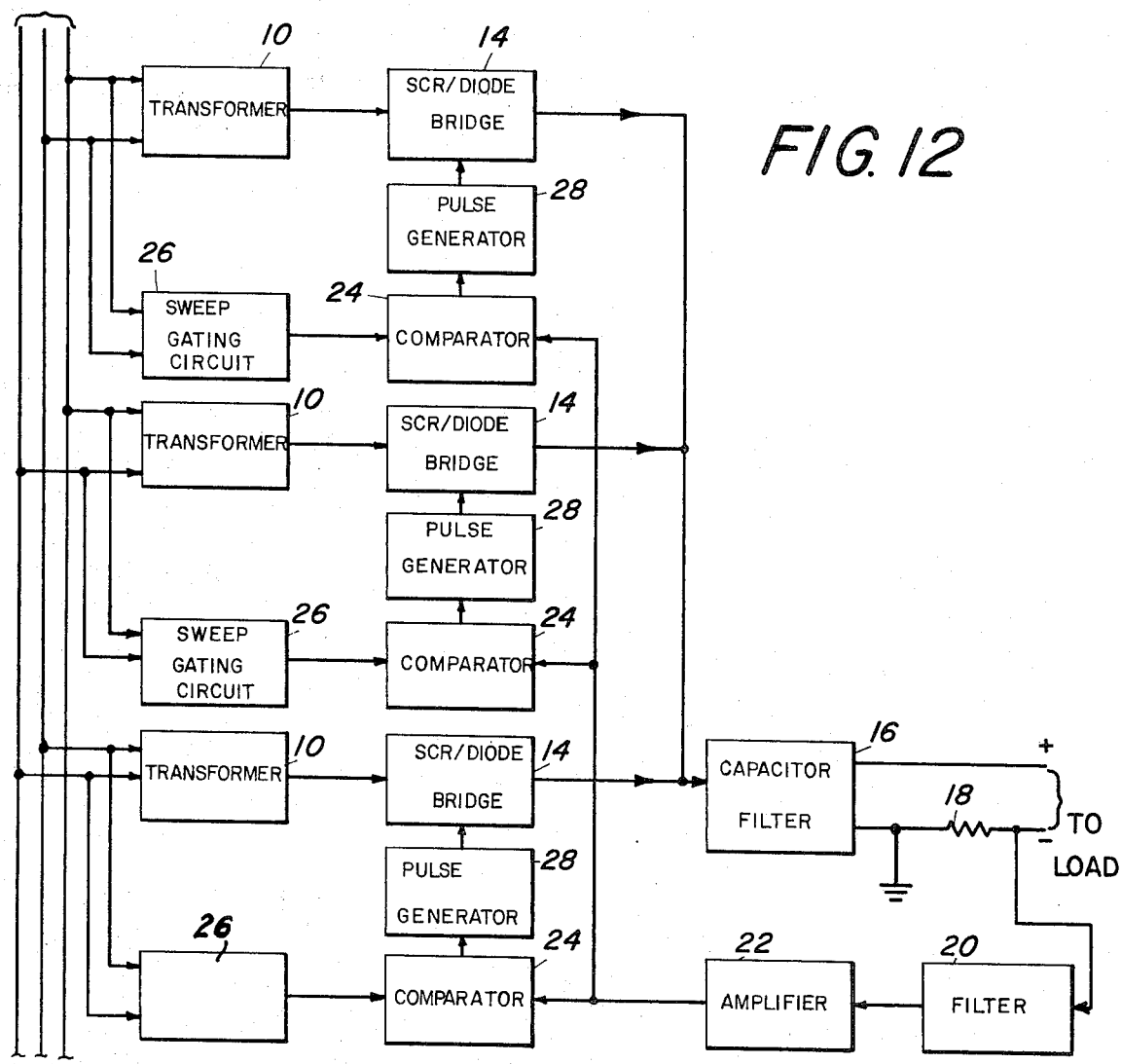
FIG. 12
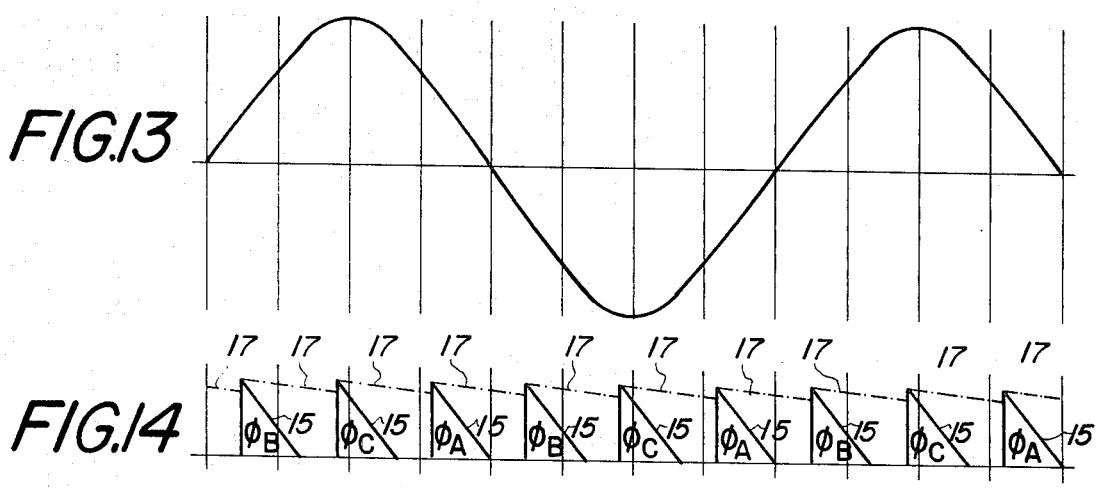
FIG. 13
FIG. 14

3,767,998

CONSTANT CURRENT POWER SUPPLY

BACKGROUND OF THE INVENTION

This invention relates to regulated power supplies, and particularly to constant current power supplies.

In certain areas, such as the driving of stepping motors, it is desirable to have a constant current delivered by a power supply. This is commonly achieved by means of a simple series resistance, or electronically by chopping, i.e. time modulated switching. Supplies utilizing series resistances are very inefficient. Electronic chopping often works well, but certain practical problems arise when it is desired to operate stepping motors over a wide speed range.

An object of the invention is to overcome these disadvantages.

Another object of this invention is to improve power supplies.

SUMMARY OF THE INVENTION

According to some features of the invention, these problems are overcome by producing a unidirectional voltage from an alternating source with rectifier means. Control means in the rectifier means turn the rectifier means on and off. Current sensing means at the output of the rectifier means produce a value signal responsive to the value of the current emerging from the rectifier means. Sweep circuit means produce a sweep signal having a given period and varying within the period. Comparator means respond to the sweep circuit means and the current sensing means for comparing the momentary levels of the signals and are connected to the control means for constraining the control means to turn on the rectifier means for the remainder of each period after each time one of the signals bears a predetermined relation to the other. In this way, the comparator means behaves like a voltage-to-time converter.

According to another feature of the invention, the rectifier means includes a rectifier bridge and capacitor filter means.

According to still another feature of the invention control means form part of the bridge and include a thyristor.

According to yet another feature of the invention, the bridge is composed of four arms two of which include respective thyristors and two of which include respective diodes. The comparator means triggers the thyristors each time one of the signals bears a predetermined relation to the other.

According to another feature of the invention, the comparator means constrains the control means to turn on the rectifier means each time the sweep signal exceeds the value signal.

According to another feature of the invention, the bridge includes input means for responding to a given power waveform and the sweep circuit means includes waveform means for producing a sweep signal corresponding in change rate to at least a portion of the given power waveform.

According to yet another feature of the invention, the given power waveform has a rising initial portion and a declining second portion. The waveform means produces a sweep corresponding in rate of change to the second portion.

According to yet another feature of the invention, the sweep circuit means includes waveform producing means for producing a cyclical waveform which remains constant through one half period and rises slowly and thereafter faster for the remaining half of the period of each cycle.

According to still another feature of the invention, the waveform constitutes the rising portions of a positively-clamped negative-going full-wave rectified sinusoid.

According to still another feature, diode means generate a negative-going positively-clamped full-wave rectified waveform, and switch means connect to the diode means for preventing generation of the declining portion of the positively-clamped full-wave rectified waveform.

According to another feature, switch means shunt the declining portion of the positively-clamped full-wave rectified waveform to ground and pass the remaining portion of the waveform.

According to other features of the invention, the switch means include a switch connected across the diode means and voltage generating means for turning the switch on during the declining portion of the positively-clamped full-wave rectified waveform and turning the switch off during the ascending portion of the positively-clamped full-wave rectified waveform. Second diode means produce a full-wave rectified potential. Shunt means connect across the full-wave rectified potential. Clamping means clamp the full-wave rectified potential negatively and connect it to the shunt means to turn on the shunt means at the peak of each full-wave rectified waveform. The shunt means includes a thyristor. The switch includes a transistor. The thyristors connected across the base emitter circuit of the transistor and the diode means across the collector emitter circuit of the transistor. The output of the transistor triggers the thyristors in the bridge.

According to another feature of the invention, the current sensing means include biasing means so as to bias the value signal about a predetermined bias potential.

According to the invention, the comparator constitutes a current-responsive voltage-to-time conversion circuit that triggers the thyristors in the bridge at times which produce an appropriate voltage output to correct for the particular current produced.

By virtue of these features it is possible to adjust the voltage continuously in response to the output current. This voltage adjustment is achieved by triggering the thyristors in the second half of each half cycle so that the voltage applied across the capacitor can be increased or reduced in response to the desired current.

In this manner the voltage delivered to the load, such as a stepping motor, is only sufficient to allow the required current to flow. In a typical high-performance stepping motor, coil impedances are quite low (typically 1 ohm or less). Thus, the voltage drop across the winding at zero speed is also low. In a typical case a 0.3 ohm motor may require 10 amp. of current so that the voltage drop is 3 volts. At high speed, inductive reactance of the windings is high so that the voltage required is also high. Under these conditions the supply will deliver the required voltage at high speeds and maintain a constant current. This type of operation, then sets the motor voltage at the value required for a given speed and no more. This action virtually eliminates the mechanical resonant frequency problems observed in conventional stepping motor supply systems in which the peak voltage applied (and thus the current rate of rise in the windings) is the same at all frequencies. With such conventional systems, shock excitation of the rotor on each pulse results in rotor oscillation. If the pulse train is related to the natural resonan frequency of the rotor it is possible to discover regions where the operation of the system is erratic. The voltage programming virtually eliminates this type of problem.

When used in conjunction with a pair of transistor bridges, constant current driving of this type allows complete utilization of all motor windings, while maintaining high efficiency in the supply system. This becomes particularly important in high-powered motors where conventional resistance limiting of current can easily dissipate 1,000 watts per motor.

In a system where the speed is programmed from a low speed to a maximum back to low speed, and then stopped (typical of machine tool control), the voltage programming insures that the amount of overshoot on the final steps is minimized.

These and other features of the invention are pointed out in the claims. Other objects and advantages of the invention will become known from the following detailed description when read in light of the accompanying drawings.

BRIEF DESCRIPTION OF THE DRAWINGS

FIG. 12 is a block diagram illustrating another power supply embodying features of the invention;

FIG. 13 is a voltage-time graph illustrating the input voltage of one phase to the supply in FIG. 12; and FIG. 14 is a voltage-time diagram illustrating the unfiltered and filtered output voltages of the supply in FIG. 12.

DETAILED DESCRIPTION OF PREFERRED EMBODIMENTS

Figure 1:
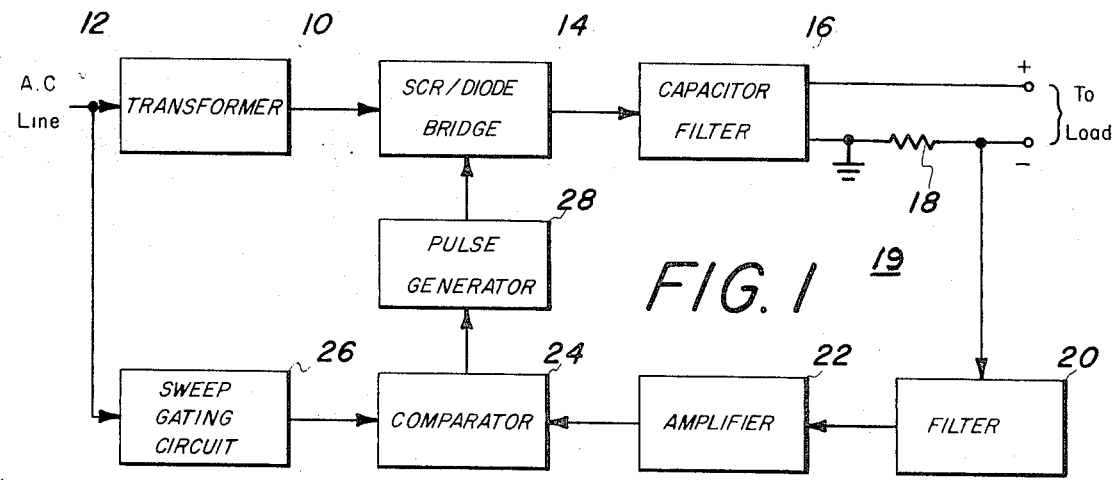
FIG. 1 is a block diagram illustrating a power supply embodying features of the invention.
Figure 2:
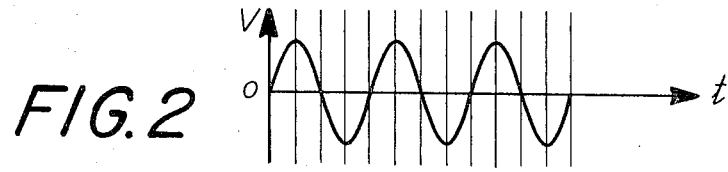
FIG. 2 is a voltage-time graph illustrating the input voltage to the supply in FIG. 1.
Figure 3:
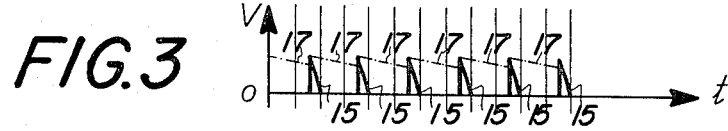
FIG. 3 is a voltage-time diagram illustrating the unfiltered and filtered output voltages of the supply in FIG. 1.

In FIG. 1 a transformer 10 raises or lowers the voltage from an A.C. line 12 to a value higher than that needed for operating the desired load, which in this embodiment is a stepping motor, at the desired constant current I. FIG. 2 illustrates the output of the transformer 10. An SCR (silicon controlled rectifier)-diode bridge 14 rectifies the output of the transformer 10 so as to establish a full-wave output voltage which, if unfiltered would appear as shown by curve 15 in FIG. 3. During each half-wave the bridge 14 is triggered into conduction only after a predetermined time period depending upon the output load. A capacitor filter 16 filters the bridge output voltage and applies it to a load through a current sensing resistor 18. The filtered voltage exhibits the waveform 17 in FIG. 3.

The current sensing resistor 18 connected in the negative or ground line from the capacitor filter to the load, produces a voltage corresponding to the current passing to the load. This voltage constitutes an input to a feedback loop 19 that establishes the time during each half cycle that the bridge 14 is triggered.

Figure 4:
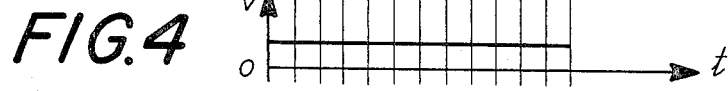
FIG. 4 is a voltage-time diagram illustrating the current-responsive sensed voltage in the supply of FIG. 1.

In the loop 19, a filter 20 applies the voltage appearing across the current sensing resistor 18 to an amplifier 22. The latter generates an error signal as shown in FIG. 4. The error signal is made to vary about a predetermined mid-value or reference value. A comparator 24 compares the value of the error signal with a partially sinusoidal sweep signal emerging from a sweep gating circuit 26 and shown in FIG. 5. The comparator produces substantially no output until the sweep signal exceeds the error signal. Thus, within each half cycle no output signal leaves the comparator 24 until the sweep signal exceeds the error signal. The output signal from the comparator continues only so long as the sweep signal from the circuit 26 exceeds the error signal from the amplifier 22. Thus, the comparator output appears as shown in FIG. 6.

Figure 7:
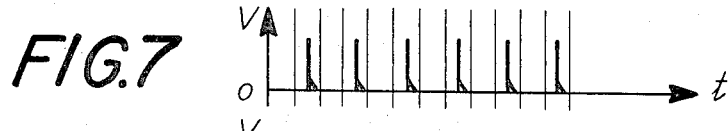
FIG. 7 is a voltage-time diagram of the output of a pulse generator in the supply of FIG. 1.

A pulse generator 28 differentiates the leading edge of the output of the comparator to produce the pulses shown in FIG. 7. These pulses trigger the SCRs in the bridge 14, thereby activating the bridge for the remainder of the half cycle, to produce the output shown in FIG. 3.

Figure 8:
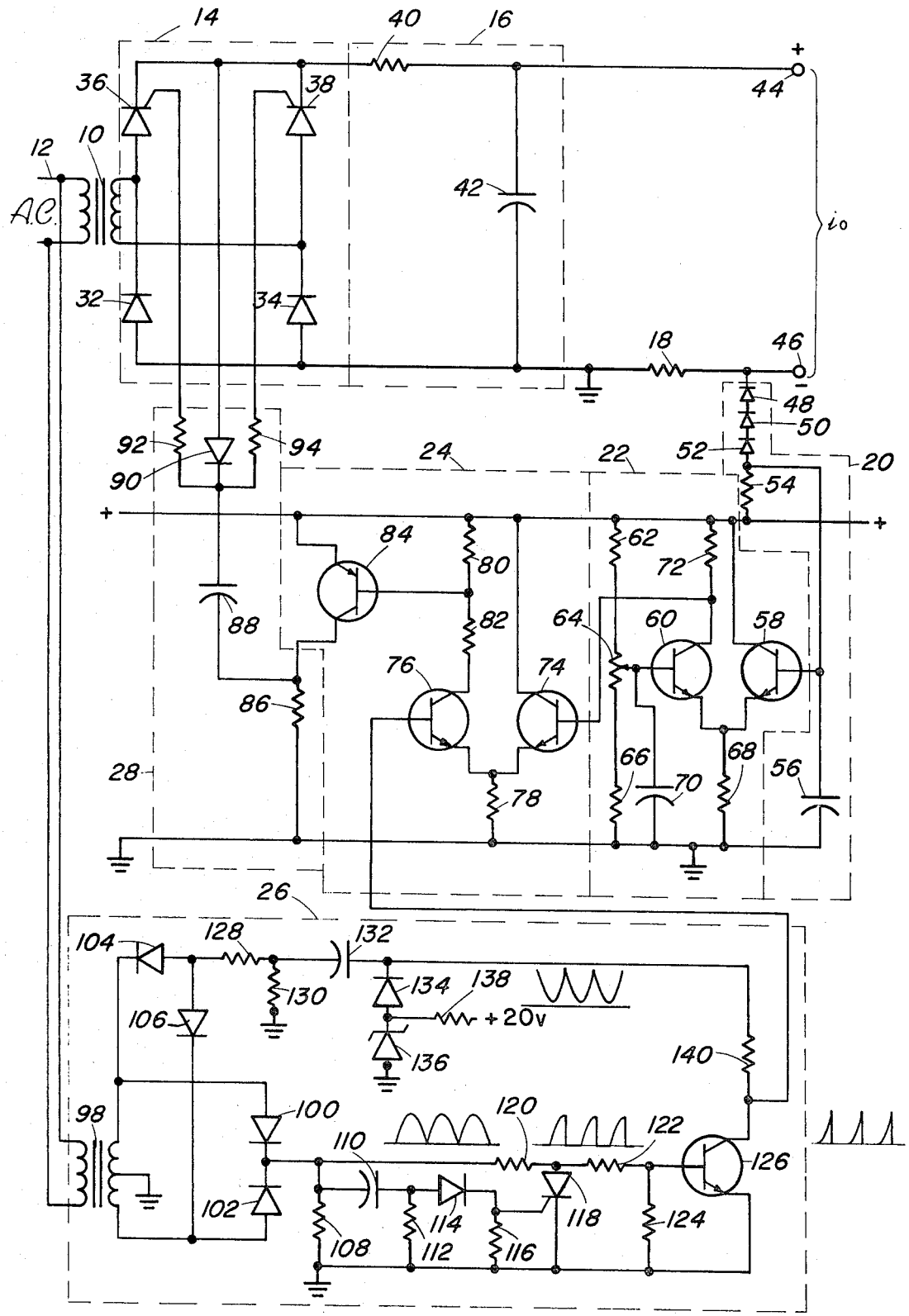
FIG. 8 is a detailed circuit diagram of the supply in FIG. 1.

FIG. 8 illustrates the circuit of FIG. 1 in detail. In FIG. 8 the transformer 10 applies the sinusoidal voltage appearing at the primary of the transformer 10 across the bridge 14 which is composed of diodes 32 and 34 and SCRs 36 and 38. When properly triggered, the bridge 14 produces the output illustrated in FIG. 3 and applies it to a 0.5 ohm resistor 40 and a filter capacitor 42 in the filter 16. The resulting filtered output voltage appears across the terminals 44 and 46.

The current sensing resistor 18 has a value equal to 2/I, where I is the value of the constant current to be supplied to the load. The resistor 18 is placed in series with the load between the grounded side of the capacitor 42 and the terminal 46. The load current passing from the terminals 44 and 46 to the load thus establishes a voltage across the resistor 18. This voltage places the terminal 46 at a positive potential slightly above ground. This voltage may be considered a return signal. When the current flow to the load is equal to the desired current I the voltage across the resistor 18, and hence at the terminal 46 is equal to a desired value V. When the current through the load is less than I the voltage across the resistor 18 is less than V. Similarly, a load current greater than I produces a return signal greater than V.

Within the filter 20 three series connected diodes 49, 50 and 52 raise the average value of the return signal two volts above the value V. A supply resistor 54 connected to a positive source energizes the diodes 48, 50 and 52. A filter capacitor 56 whose value may, for example, be 270 microfarads filters the raised return signal and applies it to the base of a transistor 58 in the amplifier 22.

The filtered and raised return voltage at the base of transistor 58 is compared with a reference voltage established at the base of a transistor 60. This reference voltage is established by three resistors 62, 64 and 66 connected between a positive terminal and ground. The resistor 64 is a variable resistor and may be adjusted. The comparison is accomplished by virture of the transistors 58 and 60 being connected in differential amplifier relationship with a common emitter coupling resistor 68. A capacitor 70 serves to filter the reference voltage at the base of transistor 60. A collector resistor 72 forms the output of the differential amplifier.

When the increased return signal exceeds the reference voltage the transistor 58 begins to conduct more heavily than the transistor 60 and raises the potential across the resistor 68. This further reduces the emitter-collector current in the transistor 60 thereby raising the collector voltage of the transistor 60. When the reference voltage exceeds the increased return signal, conduction of the transistor 60 increases while the rise in voltage across the resistor 68 reduces emitter-collector current flow in transistor 58. The voltage of the collector in transistor 60 thus decreases. The collector voltage at the transistor 60 may be considered the error voltage.

The error voltage varies about a value established by the reference voltage at the base of transistor 60. For example, according to one embodiment of the invention, it varies from 5 to 15 volts.

In the comparator 24 the error signal is applied to the base of a transistor 74 which forms a differential amplifier with a transistor 76. The latter transistor receives the sweep voltage illustrated in FIG. 5. A coupling resistor 78 common to the emitters of both transistors 74 and 76 causes the transistor whose base carries the higher potential to conduct more heavily than the other. Series collector resistors 80 and 82 measure the current flow in the transistor 76. They bias a PNP amplifier-forming transistor 84.

Figure 5:
FIG. 5 is a voltage-time diagram illustrating the sweep voltage generated in FIG. 1.
Figure 6:
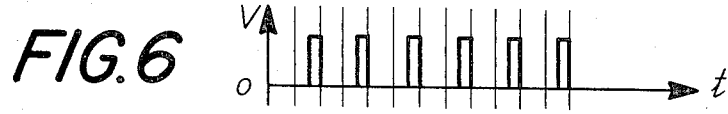
FIG. 6 is a voltage-time diagram illustrating the comparator output voltage in the comparator of FIG. 1.

As long as the sweep voltage illustrated in FIG. 5 and applied to the base of transistor 76 is less than the error voltage, the transistor 74 conducts heavily and substantially turns off the transistor 76. Thus, current flow through the resistor 80 is insufficient to cause a high enough bias to produce a substantial output at the collector of transistor 84. This collector is biased by collector resistor 86 in the pulse generator 28. As soon as the sweep voltage of FIG. 5 exceeds the error voltage, the current in transistor 76 rises and raises the emitter voltage of the transistor 74 with respect to its base voltage. The resulting high emitter-collector current in transistor 76 and resistors 80 and 82, lowers the base voltage relative to the emitter voltage in the PNP transistor 84. The transistor 84 thus conducts heavily and the voltage across collector resistor 86 rises. This rise is reflected in the step at the leading edge of each pulse in FIG. 6. The pulse ends when the sweep voltage in FIG. 5 returns to its minimum value below the value of the error voltage. This produces the negative going step at the trailing end of each pulse in FIG. 6.

In the pulse generator 28 a capacitor 88 forms a differentiator with the resistor 86. The leading and trailing edges of each of the pulses in FIG. 6 is thus differentiated. This produces narrow positive and negative going pulses. The negative going pulses are in effect "grounded" by a diode 90 that connects the differentiator to the positive terminal of the bridge 14. Resistors 92 and 94 pass the positive going narrow pulses to the gates of SCRs 36 and 38.

The positive going spikes or pulses trigger the SCRs 36 and 38 at their gates and render them conductive. It is only during these conductive periods that the components of the bridge can perform their conductive functions. Conduction continues till the end of the respective half cycles. The SCRs then turn themselves off until a new pulse at the gate turns them on.

If the current to the load is less than the desired current I, the return signal is lower than the value V. This produces a comparatively low error voltage. Thus, the sweep circuit voltage applied to the base of transistor 76 can exceed the error voltage applied to the base of transistor 74 at an earlier moment in each half cycle. This produces a narrow trigger pulse earlier in each half cycle and triggers the SCRs 36 and 38 at earlier moments. Thus, in each half cycle, the bridge 14 stores higher voltage peaks across the capacitor 42, thereby furnishing an increased direct voltage at terminals 44 and 46 and augmenting the load current. The load current rises toward the value I.

If the load current increases beyond the value I, the error signal at the base of transistor 74 exceeds the sweep voltage for a longer period during each half cycle, thus the positive trigger pulses formed by the pulse generator 28 do not trigger the SCRs 36 and 38 until later in the cycle. This reduces the voltage peaks applied across the capacitor 42, and the direct voltage across terminals 44 and 46, thereby decreasing the load current.

The sweep signal of FIG. 5 is not linear but sinusoidal. This sinusoidal sweep signal offers a number of advantages. In particular it affords linearity, because supply voltage energizing the SCRs is sinusoidal and the pulses triggering the SCRs 36 and 38 are timed on the basis of a sinusoid synchronous with the supply voltage. The comparator 24 essentially operates as a voltage-to-time, or voltage-to-phase converter.

Figure 9:
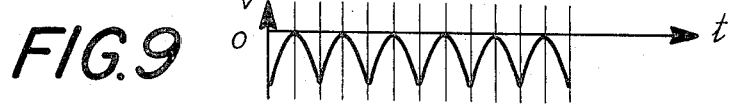
FIG. 9 is a voltage-time diagram illustrating a waveform produced in the circuits of FIG. 1 and FIG. 8 and for generating the sweep voltage of FIG. 5.

In circuit 26 a transformer 98 applies a sinusoidal voltage to a positive full-wave rectifier composed of diodes 100 and 102 and a negative full-wave rectifier composed of diodes 104 and 106. The output of the positive full-wave rectifier is applied across a resistor 108. A clamp composed of a clamping capacitor 110, a resistor 112, and a diode 114, clamps the full-wave rectified positive voltage at its peak value so that it becomes effectively a negative going voltage as shown in FIG. 9. This negative going voltage goes positive only at the peak of each half-wave. This peak is applied to the gate of an SCR 118. A resistor 120 applies the positive rectified full-wave voltage formed by the diodes 100 and 102 across the SCR 118. Thus, the SCR 118 fires at the peak of each half cycle and remains conductive through the remainder of each half cycle.

Figure 10:
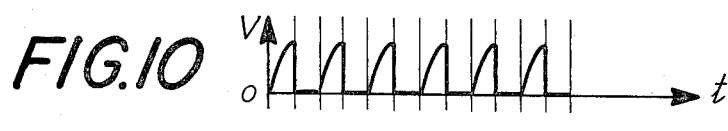
FIGS. 10 and 11 are waveforms also generated in the circuit of FIGS. 1 and 8 for producing the sweep voltage illustrated in FIG. 5.

The conduction of the SCR 118 at the peak of each half cycle effectively collapses the positive full-wave rectified voltage appearing between the diodes 100 and 102 after each peak so that voltage dividing resistors 122 and 124 apply signals corresponding to those shown in FIG. 10 to the base of a transistor 126.

At the same time a pair of voltage dividing resistors 128 and 130 apply the negative full-wave rectified voltage appearing between the diodes 102 and 104 to a positive clamp composed of a clamping capacitor 132 and a diode 134 as well as a Zener diode 136. A 20 volt source energizes the Zener diode 136, whose drop is 5v, through a resistor 138. Thus, the negative half-wave rectified voltage between the diodes 104 and 106 is clamped to a positive 5 volt value and appears as shown in FIG. 11.

A resistor 140 applies this signal to the collector of the transistor 126.

This signal is always positive. The accompanying voltage applied to the base of the transistor 126 serves to saturate the transistor 126 during the first half of each half cycle. During this period the voltage across the transistor is equal to the saturated voltage drop thereacross. In the course of the second half of each half cycle the voltage applied to the base is substantially zero. During this time the transistor 126 remains substantially non-conductive. Thus, during this remaining half of each half cycle, the voltage across the transistor 126 conforms to the collector voltage applied thereto. As a result, the voltage across the transistor 126 is substantially zero during the first half cycle and follows the collector voltage during the second half cycle so that it appears as shown in FIG. 5.

Figure 11:
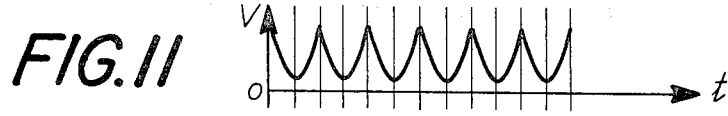

Effectively, the transistor 126 operates as a shunting switch across the voltage shown in FIG. 11. The switch is closed during the first half cycle and open during the second half cycle. The resulting waveform, shown in FIG. 5, appears at the base of transistor 76 in the comparator 24. As stated before, the comparator 24 delivers an output voltage each half cycle as soon as the sweep voltage appearing at the base of transistor 76 exceeds the error voltage appearing at the base of transistor 74. In this way the voltage of a partial sinusoid serving as a sweep voltage is compared with an error voltage. The result is a voltage-to-time conversion which is substantially nonlinear. That is, the conversion follows a sinusoidal pattern. If the error voltage is low, a small change produces a comparatively rapid shift in time position or phase within each cycle. At higher error voltages, the comparator 24 converts incremental voltage changes to smaller time or phase changes.

The sinusoidal nonlinearity of the voltage-to-time conversion performed by the comparator 24 exactly compensates for the sinusoidal nonlinearity inherent in the time-to-voltage conversion performed by triggering the sinusoidally excited SCRs 36 and 38 with pulses generated by the leading edge of the comparator output voltage. That is to say, as the pulse generator 28 provides the sinusoidally timed pulses of FIG. 7 to trigger the SCRs 36 and 38, a sinusoidally varying time-to-voltage conversion occurs. In the SCRs, however, in contrast to the nonlinear voltage-to-time conversion in the comparator small incremental changes in a pulse arriving early during the second part of each half cycle cause small peak output voltage changes, whereas incremental variations arriving later in the second part of each half cycle effect more significant peak voltage changes each half cycle. Both conversion nonlinearities are sinusoidal and opposed to each other. Thus, they effectively compensate for each other and a feedback linearity prevails.

In order to maintain this linearity, the diodes 48, 50 and 52 bias the transistor 58 and the amplifier 22, and the variable resistor 64 is adjusted so that the error voltage measured by the comparator 24 at the base of transistor 74 varies about a value that corresponds to a predetermined trigger time or phase.

The time scales in FIGS. 2 to 7 and 8 to 11 are the same.

Examples of the values for particular resistors and capacitors suitable for use in the embodiment in FIG. 8 follows.

| | |
|---|---|
| Resistor 40 | 0.5 ohms |
| Diodes 48,50,52 together | 2 volt forward drop, total |
| Resistor 54 | 4.7 K |
| Capacitor 56 | 270µf, 6V |
| Resistor 62 | 3K |
| Resistor 64 | 25K |
| Resistor 66 | 470 ohms |
| Resistor 68 | 680 ohms |
| Resistor 78 | 47K |
| Resistor 80 | 4.7K |
| Resistor 82 | 4.7K |
| Resistor 86 | 470 ohms |
| Capacitor 88 | 1µf, 100V |
| Resistor 92 | 27 ohms |
| Resistor 94 | 27 ohms |
| Resistor 108 | 1K |
| Capacitor 110 | 30 µf, 25V |
| Resistor 112 | 75K |
| Resistor 116 | 4.7K |
| SCR 118 | 2 N5004 |
| Resistor 122 | 10K |
| Resistor 124 | 4.7K |
| Resistor 128 | 470 ohms |
| Resistor 130 | 1 K |
| Capacitor 132 | 30 µf, 25V |
| Capacitor 138 | 47K |
| All NPN transistors | 2N4124 |
| PNP transistor 84 | 2N4126 |

The invention is suitable for use in high powered configurations utilizing polyphase A.C. inputs. FIG. 12 illustrates a three-phase system embodying features of the invention. Here the transformer 10, the SCR bridges 14, the sweep gating circuit 26, the comparator 24, and the pulse generator 28 of FIG. 1 are repeated for each of the three phases of the system. Their interconnections in each repetition correspond to that of FIG. 1. Each transformer and sweep gating circuit is connected across one phase of input lines 150. The capacitor filter 16, the resistor 18, the amplifier 22, and the filter 20 are not repeated. Rather the outputs of each of the three bridges 14 are connected to the input of the capacitor filter 16. The amplifier 22 feeds each of the comparators 24 as shown in FIG. 12.

The components of each individual phase operate as previously described. The voltage of the phase of the polyphase lines appears in FIG. 13. For clarity, the time scale here differs from that in FIGS. 2 to 7 and 9 to 11. The output voltage of the supply for the balance three-phase system appears in FIG. 14. Here, the time scale corresponds to the time scale in FIG. 13.

What is claimed is:

1. A power supply for energizing a load in response to a given alternating waveform having successive rising and declining portions and slope reversal points between each rising and declining portion and between each declining and rising portion, comprising rectifier means for responding to the power waveform for producing a unidirectional voltage, control means in said rectifier means for turning said rectifier means on and off, current sensing means at the output of said rectifier means for producing a value signal responsive to the value of the current emerging from said rectifier means, sweep circuit means for producing a periodic sweep signal having a given period timed to straddle the reversing points so that at least a part of the rising portion and declining portion occur during each period, said sweep circuit means varying within the period, comparator means responsive to said sweep circuit means and said current sensing means for comparing the momentary levels of the signals and connected to said control means for constraining said control means to turn on said rectifier means after each time one of the signals bears a predetermined relation to the other, said sweep circuit means producing a sweep signal which is substantially constant during each period before the reversal and changes continuously in a given direction during at least a part of the remainder of the period.

2. A supply as in claim 1, wherein said rectifier means include capacitor means and said control means include a thyristor.

3. A supply as in claim 1, wherein the sweep signal changes slowly after the reversal and thereafter faster for the remainder of the period.

4. A supply as in claim 3, wherein said rectifier means include capacitor means and said control means include a thyristor.

5. A supply as in claim 3, wherein said sweep circuit means produces a sweep signal after a reversal with a rate of change corresponding to the rate of change of the power waveform afer the reversal.

6. A supply as in claim 5, wherein said rectifier means includes a rectifier bridge and capacitor filter means.

7. A supply as in claim 6, wherein said control means form part of said bridge and include a thyristor.

8. A supply as in claim 7, wherein said bridge includes four arms two of which include respective thyristors and two of which include respective diodes.

9. A supply as in claim 7, wherein said bridge includes four arms two of which include respective thyristors and two of which include respective diodes.

10. A supply as in claim 3, wherein the sweep circuit means produces the sweep signal so that its value remains constant through one half period up to the reversal and rises slowly and thereafter faster for the remaining half period.

11. A supply as in claim 10, wherein said rectifier means include capacitor means and said control means include a thyristor.

12. A supply as in claim 3, wherein the signal produced by said sweep circuit means follows the portion of a full wave rectified sinusoid, having zero slopes and clamped at the zero slopes, which follows the zero slope.

13. A supply as in claim 12, wherein said rectifier means include capacitor means and said control means include a thyristor.

14. A supply as in claim 10, wherein the signal produced by the sweep circuit follows the rising portion of a positively-clamped negative-going full-wave rectified sinusoid.

15. A supply as in claim 14, wherein said rectifier means include capacitor means and said control means include a thyristor.

16. A supply as in claim 12, wherein said sweep circuit means has diode means for forming the clamped waveform, and switch means connected to said diode means for preventing generation of the portion of the full-wave rectified waveform prior to the zero slope.

17. A supply as in claim 16, wherein said rectifier means include capacitor means and said control means include a thyristor.

18. A supply as in claim 16, wherein said switch means shunts the portion of the full-wave rectified signal to ground and passes the remaining portion of the signal.

19. A supply as in claim 18, wherein said rectifier means include capacitor means and said control means include a thyristor.

20. A supply as in claim 16, wherein said switch means includes a switch connected across said diode means and voltage generator means for turning said switch means on during the portion of the full-wave rectified signal prior to the zero slope and turning said switch means off during the portion of the full-wave rectified waveform after the zero slope.

21. A supply as in claim 20, wherein said voltage generator means includes second diode means for producing a full-wave rectified potential, shunt means connected across said full-wave rectified potential, clamping means for clamping the full-wave rectified potential so that the zero slope is at zero level and connecting it to said shunt means so as to turn on said shunt means at the zero slope of each full-wave rectified waveform.

22. A supply as in claim 21, wherein said shunt means includes a thyristor.

23. A supply as in claim 22, wherein said switch means includes a transistor and said thyristor is connected between the base and emitter of said transistor, said diode means being connected from collector to emitter of said transistor.

24. A supply as in claim 3, wherein said rectifier means includes a rectifier bridge and capacitor filter means, and wherein said control means forms part of said bridge and includes a transistor.

25. A supply as in claim 24, wherein said sweep circuit means has diode means for forming a negative-going positively-clamped full-wave rectified waveform, and switch means connected to said diode means for preventing generation of the declining portion of the full-wave rectified waveform.

26. A supply as in claim 25, wherein said switch means shunts the declining portion of the positively-clamped full-wave rectified waveform to ground and passes the remaining portion of the waveform.

27. A supply as in claim 25, wherein said switch means includes a switch connected across said diode means and voltage generator means for turning said switch means on during the declining portion of the positively-clamped full-wave rectified waveform and turning said switch means off during the ascending portion of the positively-clamped full-wave rectified waveform.

28. A supply as in claim 27, wherein said voltage generating means includes second diode means for producing a full-wave rectified potential, shunt means connected across said full-wave rectified potential, clamping means for clamping the full-wave rectified potential negatively and connecting it to said shunt means so as to turn on said shunt means at the peak of each full-wave rectified waveform.

29. A supply as in claim 28, wherein said shunt means includes a thyristor.

30. A supply as in claim 29, wherein said switch means includes a transistor and said thyristor is connected between the base and emitter of said transistor, said diode means being connected from collector to emitter of said transistor.

31. A supply as in claim 24, wherein said bridge includes four arms, two of said arms having respective thyristors connected therein and two of said arms having diodes connected therein, said thyristors being connected to the output of said comparator means.

32. A supply as in claim 24, wherein said bridge includes four arms, two of said arms having respective thyristors connected therein and two of said arms having diodes connected therein, said thyristors being connected to the output of said comparator means.

33. A power supply for energizing a load from a multiphase power source each of whose phases includes successive rising and descending portions with zero slope points between the rising and descending portions, comprising a plurality of rectifier means each responsive to the source for producing a unidirectional voltage from one phase, control means in each of said rectifier means for turning said rectifier means on and off, current-sensing means connected to the output of each rectifier means for producing a value signal responsive to the value of currents emerging from each of said rectifier means, a plurality of sweep circuit means each for producing a sweep signal having a given period which straddles the zero slope points of each phase so as to occur at least in part during a rising and descending portion and varying within the period, a plurality of comparator means each responsive to one of said sweep circuit means in said current-sensing means for comparing the momentary levels of the signals and connecting to each of said control means for constraining said control means to turn on said rectifier means after each time one of said signals bears a predetermined relation to the other, said sweep circuit means producing a sweep signal during each period which is substantially constant before the zero slope point and changes continually in a given direction during at least a part of the remainder of the period.

34. A supply as in claim 33, wherein each of said sweep circuit means produces a signal which first rises slowly after the zero slope point and thereafter faster for the remaining period of each cycle.

35. A supply as in claim 34, wherein each of said sweep circuit means produces a sweep signal after each zero slope point so that the rate of change corresponds to the rate of change of the source after a zero slope point.

* * * * *